(12) United States Patent
Li

(10) Patent No.: US 9,502,912 B2
(45) Date of Patent: Nov. 22, 2016

(54) MOBILE POWER DEVICE

(71) Applicants: Giga-Byte Technology Co., Ltd., New Taipei (TW); Gigazone International Co., Ltd, New Taipei (TW)

(72) Inventor: Lin Li, New Taipei (TW)

(73) Assignees: GIGA-BYTE TECHNOLOGY CO., LTD., New Taipei (TW); GIGAZONE INTERNATIONAL CO., LTD, New Taipei (TW)

( * ) Notice: Subject to any disclaimer, the term of this patent is extended or adjusted under 35 U.S.C. 154(b) by 217 days.

(21) Appl. No.: 14/306,473

(22) Filed: Jun. 17, 2014

(65) Prior Publication Data
US 2015/0303722 A1 Oct. 22, 2015

(30) Foreign Application Priority Data

Apr. 17, 2014 (TW) .............................. 103206692 U

(51) Int. Cl.
*H02J 7/00* (2006.01)

(52) U.S. Cl.
CPC .................................... *H02J 7/0045* (2013.01)

(58) Field of Classification Search
USPC ....................................................... 320/112
See application file for complete search history.

(56) References Cited

U.S. PATENT DOCUMENTS

| 2009/0267562 | A1* | 10/2009 | Guccione | H02J 7/0054 320/114 |
| 2011/0025263 | A1* | 2/2011 | Gilbert | H02J 7/0044 320/108 |
| 2012/0262109 | A1* | 10/2012 | Toya | H01M 10/44 320/108 |
| 2013/0049675 | A1* | 2/2013 | Minami | H02J 7/0054 320/103 |
| 2014/0203757 | A1* | 7/2014 | Ibragimova | H02J 7/0054 320/103 |

\* cited by examiner

*Primary Examiner* — Mohammed Alam
(74) *Attorney, Agent, or Firm* — Maschoff Brennan

(57) ABSTRACT

A mobile power device includes a primary rechargeable battery; a primary case covering the primary rechargeable battery; a charging electrical port, exposed to the exterior of the primary case and coupled to the primary rechargeable battery, serving to connect to an external power source for charging the primary rechargeable battery; a first discharging electrical port, exposed to the exterior of the primary case and coupled to the primary rechargeable battery, serving to connect to a load to be powered via the first discharging electrical port; a plurality of first primary electrical contacts, exposed to the exterior of the primary case and coupled to the primary rechargeable battery; and a primary magnetic member, integrally formed with the primary case, being made of ferromagnetic material or ferrimagnetic material.

10 Claims, 7 Drawing Sheets

MOBILE POWER DEVICE

CROSS-REFERENCE TO RELATED APPLICATIONS

This non-provisional application claims priority claim under 35 U.S.C. §119(a) on Patent Application No. 103206692 filed Apr. 17, 2014 in Taiwan, R.O.C, the entire contents of which are hereby incorporated by reference.

BACKGROUND

This disclosure relates to a mobile power device and, more particularly, to a mobile power device of multiple usage modes adapted to different sizes and capacities of batteries.

As portable electronics prevail in life, the demand for more slim-and-light electronics, as well as batteries, which are often integrally formed for compactness, has inevitably grown. However, the slim type of battery has a capacity limitation and the capacity may not be enough for long-term usage. To address the limitation of battery capacity, a mobile power device has emerged to charge the battery and serve as a back-up power source for the electronics.

With a mobile power device, the power to an electronic device is easily extended without any hardware refitting. However, the mobile power device still has a certain weight and volume. A large mobile power device, for example, a 10000 mAh power device, may be too heavy and bulky to be carried on-the-go, and is therefore not suitable for daily commuters or travelling on a short trip. On the other hand, a small mobile power device may be too low on power capacity and is not suitable for the purpose of travelling on a long trip. It could be costly, or not practical, if one has to carry multiple mobile power devices in order to meet different requirements.

SUMMARY

This disclosure provides a mobile power device and, more particularly, a mobile power device of multiple usage modes adapted to different sizes and capacities of batteries.

The mobile power device of the present disclosure includes a primary rechargeable battery; a primary case covering the primary rechargeable battery; a charging electrical port, exposed to the exterior of the primary case and coupled to the primary rechargeable battery, serving to connect to an external power source for charging the primary rechargeable battery; a first discharging electrical port, exposed to the exterior of the primary case and coupled to the primary rechargeable battery, serving to connect to a load to be powered via the first discharging electrical port; a plurality of first primary electrical contacts, exposed to the exterior of the primary case and coupled to the primary rechargeable battery; and a primary magnetic member, integrally formed with the primary case, being made of ferromagnetic material or ferrimagnetic material.

In one embodiment, the mobile power device further includes a first secondary rechargeable battery; a first secondary case covering the first secondary rechargeable battery; a plurality of first secondary electrical contacts, exposed to the exterior of the first secondary case and coupled to the first secondary rechargeable battery; and a first secondary magnetic member, integrally formed with the first secondary case, being made of ferromagnetic material or ferrimagnetic material. The primary magnetic member or the first secondary magnetic member is a magnet. The primary case and the first secondary case connect to each other by a magnetic force such that the first primary electrical contacts are coupled to the first secondary electrical contacts.

In one embodiment, the mobile power device further includes a plurality of second primary electrical contacts, exposed to the exterior of the primary case and coupled to the primary rechargeable battery; a second secondary rechargeable battery; a second secondary case covering the second secondary rechargeable battery; a plurality of second secondary electrical contacts, coupled to the second secondary rechargeable battery; and a second secondary magnetic member, integrally formed with the second secondary case, being made of ferromagnetic material or ferrimagnetic material. The primary case and the second secondary case connect to each other by a magnetic force such that the second primary electrical contacts are coupled to the second secondary electrical contacts.

In one embodiment, the first secondary case or the second secondary case further includes a concave trough.

In one embodiment, the primary rechargeable battery, the first secondary rechargeable battery, or the second secondary rechargeable battery may be a lithium-ion battery, lithium-ion polymer battery, NiMH battery, NiCd battery, NiFe battery, fuel cell, or lead-acid battery.

In one embodiment, the mobile power device further includes a power switch, exposed to the exterior of the primary case and coupled to the primary rechargeable battery, turning on and off the power to the load; and a power indicator light, exposed to the exterior of the primary case, serving to indicate the power to the load being on or off or the percentage of power remaining in the rechargeable batteries.

In one embodiment, the mobile power device further includes a second discharging electrical port, which is exposed to the exterior of the primary case and coupled to the primary rechargeable battery, and is used to connect to another load to be powered via the second discharging electrical port.

In one embodiment, the electrical specification for the first discharging electrical port, the second discharging electrical port, or the charging electrical port may comply with a type-A, type-B, mini-A, mini-B, micro-A, micro-B, or micro-AB of USB, or a powered-B of USB 3.0.

The rechargeable battery modules can be disassembled into independent parts and connected to each other by magnetic forces, allowing the mobile power device of this disclosure to support multiple usage modes for requirements by adapting to different sizes and capacities of batteries.

BRIEF DESCRIPTION OF THE DRAWINGS

The structure as well as a preferred mode of use, further objects, and advantages of this disclosure will be best understood by referring to the following detailed description of some illustrative embodiments in conjunction with the accompanying drawings, in which.

DETAILED DESCRIPTION OF THE PREFERRED EMBODIMENTS

In the description hereinafter, the term of "coupled" or "coupling" refers to any two objects directly or indirectly electrically connected to each other. Therefore, if it is described that "a first device is coupled to a second device," the meaning is that the first device is either directly electrically connected to the second device or indirectly electrically connected to the second device through other devices or connection means.

Figure 1:
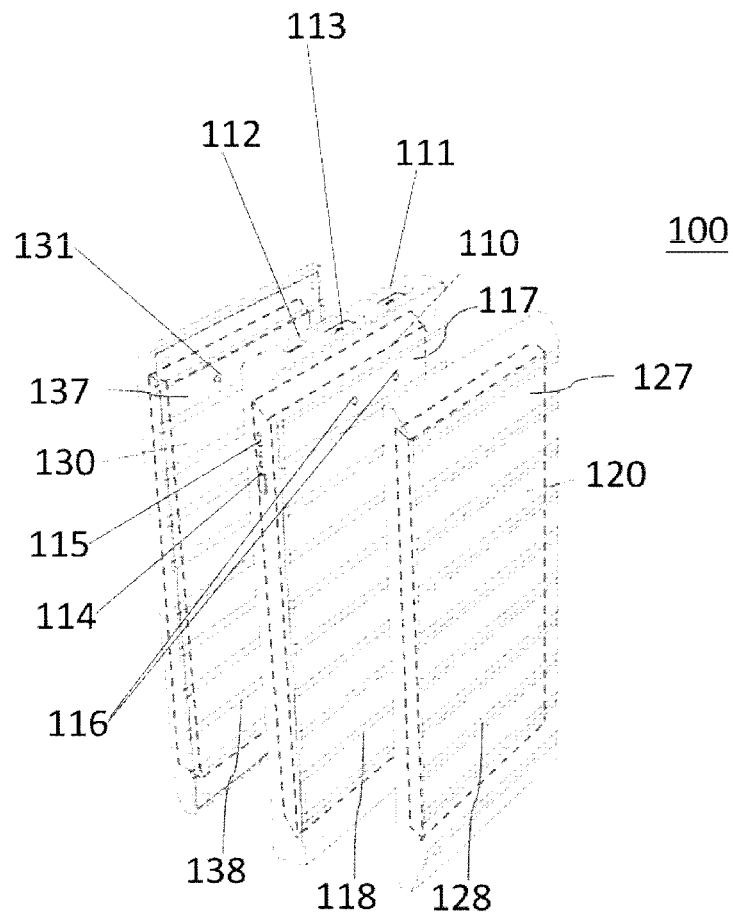
FIG. 1 is a front-side perspective view of an illustrative mobile power device according to a preferred embodiment of the disclosure.
Figure 2:
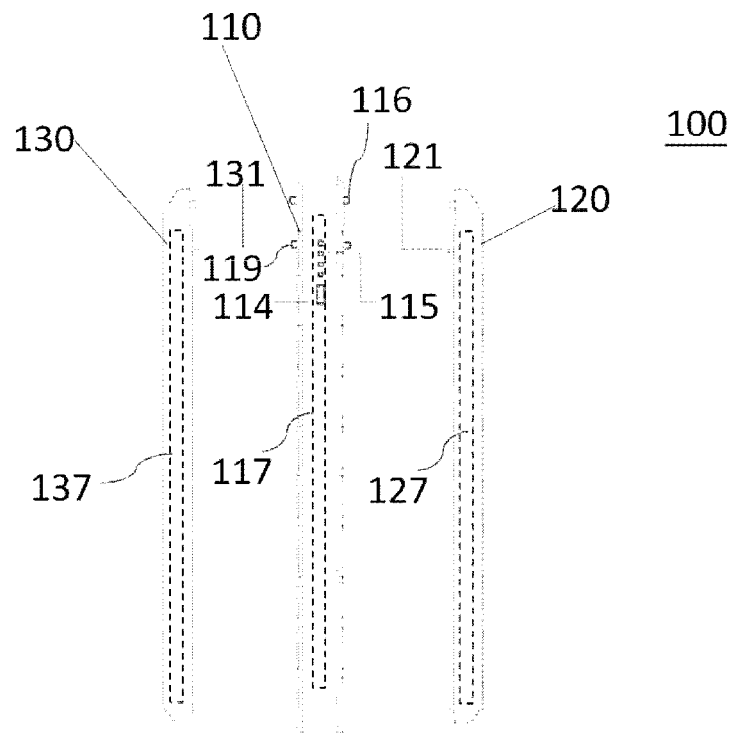
FIG. 2 is a lateral view of an illustrative mobile power device according to the embodiment of the disclosure as shown in FIG. 1.
Figure 3:
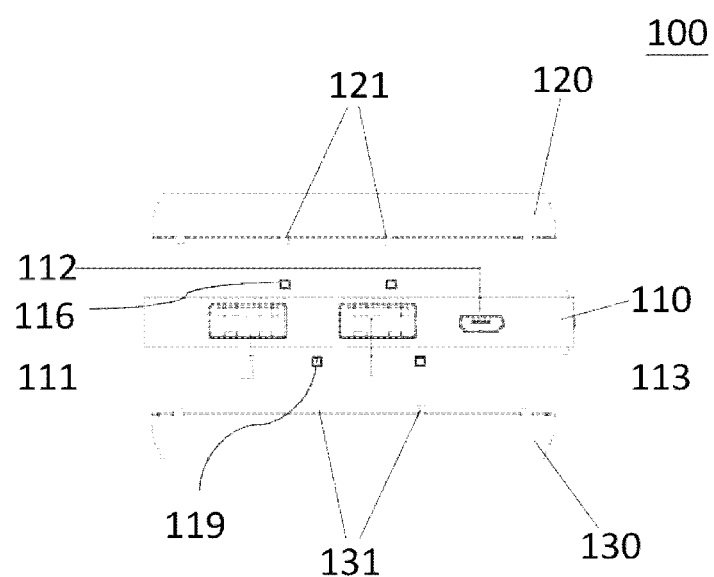
FIG. 3 is an overhead view of a mobile power device according to the embodiment of the disclosure as shown in FIG. 1.

FIGS. 1, 2, and 3 respectively show a front-side perspective view, a lateral view, and an overhead view of the mobile power device, according to an embodiment of the present disclosure. The mobile power device 100 includes a primary rechargeable battery 117 (shown as the dash line), a primary case 110, a charging electrical port 112, a first discharging electrical port 111, a plurality of first primary electrical contacts 116, and a primary magnetic member 118.

The primary case 110 is used for covering the primary rechargeable battery 117. The charging electrical port 112 is exposed to the exterior of the primary case 110 and coupled to the primary rechargeable battery 117. The charging electrical port 112 is used to connect to an external power source, for example, an AC power of commercial power through an adaptor, for charging the primary rechargeable battery 117. The first discharging electrical port 111 is exposed to the exterior of the primary case 110 and coupled to the primary rechargeable battery 117. The discharging electrical port 111 is used to connect to a load, for example, a portable electronic device such as a smartphone or tablet, so as for the mobile power device 100 to provide power to the load. The first primary electrical contacts 116 are exposed to the exterior of the primary case 110 and coupled to the primary rechargeable battery 117.

The primary magnetic member 118 is integrally formed with the primary case 110 and made of ferromagnetic material or ferrimagnetic material, such as iron, cobalt, nickel, and manganese. Here the "integrally formed" refers to the structure that, for example, the primary magnetic member 118 is disposed on one exterior side of, or inside of, the primary case 110. That is, the primary magnetic member 118 is fully covered by the primary case 110, or the primary magnetic member 118 is an integral part of the primary case 110.

The first primary electrical contacts 116 and the primary magnetic member 118 are used to mechanically and electrically connect to other rechargeable batteries so as to increase the battery capacity of the mobile power device 100. For example, the mobile power device 100 further includes a first secondary rechargeable battery 127 (shown as the dash line), a first secondary case 120, a plurality of first secondary electrical contacts 121, and a first secondary magnetic member 128. The first secondary case 120 is used for covering the first secondary rechargeable battery 117.

The first secondary electrical contacts 121 are exposed to the exterior of the first secondary case 120 and coupled to the first secondary rechargeable battery 117. The first secondary magnetic member 128 is integrally formed with, or independently disposed on one exterior side of, the first secondary case 120, and is made of ferromagnetic material or ferrimagnetic material.

The primary magnetic member 118 and/or the first secondary magnetic member 128 may be a magnet. The primary case 110 and the first secondary case 120 connect to each other by a magnetic force such that the first primary electrical contacts 116 are coupled to the first secondary electrical contacts 121. For example, the primary magnetic member 118 is a magnet, and the first secondary magnetic member is mainly made of iron metal, which is strong in ferromagnetism. If the primary magnetic member 118 and the first secondary magnetic member 128 are respectively disposed on the center parts of the primary case 110 and the first secondary case 120, and when the primary case 110 and the first secondary case 120 are close enough in distance, the primary magnetic member 118 attracts to, and aligns with, the first secondary magnetic member 128 due to magnetic effect, allowing the first primary electrical contacts 116 to electrically connect to the first secondary electrical contacts 121, thereby increasing the battery capacity of the mobile power device 100.

With the above description and reference to FIGS. 1-3, the first secondary case 120 is shown to be attracted and connected to one side of the primary case 110. In one embodiment, the primary case 110 can further, with the same approach, connect to an additional rechargeable battery on the other side. For example, the mobile power device 100 further includes a plurality of second primary electrical contacts 119, a second secondary rechargeable battery 137, a second secondary case 130, a plurality second secondary electrical contacts 131, and a second secondary magnetic member 138. The second primary electrical contacts 119 are exposed to the exterior of the primary case 110 and coupled to the primary rechargeable battery 117. The second secondary case 130 is used for covering the second secondary rechargeable battery 137. The second secondary electrical contacts 131 are coupled to the second secondary rechargeable battery 137. The second secondary magnetic member 138 is integrally formed with the second secondary case 130, and is made of ferromagnetic material or ferrimagnetic material.

The primary case 110 and the second secondary case 130 connect to each other by a magnetic force such that the second primary electrical contacts 119 are coupled to the second secondary electrical contacts 131. For example, the second secondary magnetic member 128 is made of iron metal, and is disposed on the center of the second secondary case 130, a position which corresponds to the position where the primary magnetic member 118 is disposed. When the primary case 110 and the second secondary case 130 are close enough in distance, the primary magnetic member 118 attracts to, and aligns with, the second secondary magnetic member 138 due to magnetic effect, allowing the second primary electrical contacts 119 to electrically connect to the second secondary electrical contacts 131, thereby increasing the battery capacity of the mobile power device 100.

The primary rechargeable battery 117, the first secondary rechargeable battery 127, and the second secondary rechargeable 137 of the present embodiment may be, but not limited to a lithium-ion battery, lithium-ion polymer battery, NiMH battery, NiCd battery, NiFe battery, fuel cell, or lead-acid battery.

In one embodiment, the mobile power device 100, as shown in FIGS. 1-3, further includes a second discharging electrical port 113, which is exposed to the exterior of the primary case 110 and coupled to the primary rechargeable battery 117, and is used to connect to another load, for example, a portable electronic device, to be powered via the second discharging electrical port 113. The electrical specification for the first discharging electrical port 111, the second discharging electrical port 113, or the charging electrical port 112 may comply with a type-A, type-B, mini-A, mini-B, micro-A, micro-B, or micro-AB of USB, or a powered-B of USB 3.0. In general, the USB type-A is for the first discharging electrical port 111 and the second discharging electrical port 113, and the USB micro-A is for the charging electrical port 112.

Referring to FIGS. 1-3 for one embodiment of this disclosure, the mobile power device 100 further includes a power switch 114 and a power indicator light 115. The power switch 114 is exposed to the exterior of the primary case 110 and coupled to the primary rechargeable battery 117, and is used to turn on and off the power to the load. The power indicator light 115 is exposed to the exterior of the primary case 110 and is used to indicate that the power to the load being turned on or off, or the percentage of power remaining in the batteries. For example, as shown in FIGS. 1-2, the power indicator light 115 includes four lighting objects, for example, a light-emitting diode (LED). If at least one of the lighting objects is on, it indicates that the power to the load being turned on, and if all the lighting objects are off, it indicates that the power to the load being turned off. The number of lighting objects being on indicates the percentage of power remaining in the rechargeable batteries, for example, 25%, 50%, 75%, and 100% of power remaining. Also, different color of lights or flashing lights can serve to indicate the state of being low capacity for a battery charging reminder.

Figure 4:
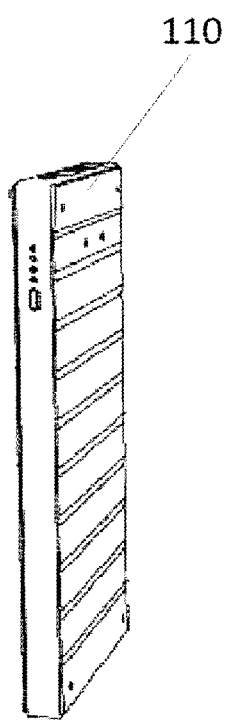
FIG. 4 is a perspective view showing the first usage mode of an illustrative mobile power device according to one embodiment of the disclosure.

Referring to FIG. 4 for the first usage mode of the mobile power device 100 according to an embodiment of this disclosure. As shown in FIG. 4, the primary rechargeable battery 117 is the only battery that provides power to the load. In all usage modes of the mobile power device 100, the first usage mode is the smallest battery capacity, for example, 5000 mAh, and has the tiny form factor, and thus the first usage mode is suitable for the on-the-go commuters or the purpose of traveling on a short trip.

Figure 5:
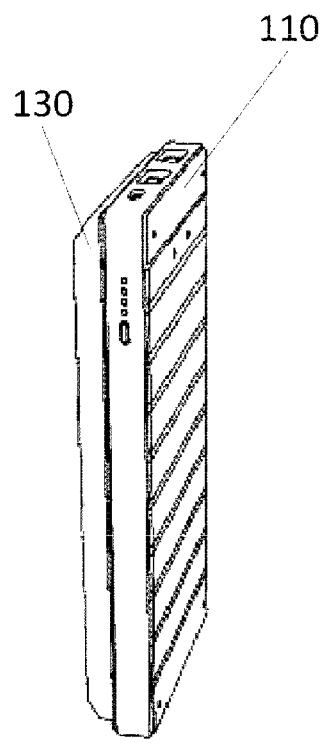
FIG. 5 is a perspective view showing the second usage mode of an illustrative mobile power device according to one embodiment of the disclosure.

Referring to FIG. 5 for the second usage mode of the mobile power device 100 according to an embodiment of this disclosure. As shown in FIG. 5, the primary case 110 and the second secondary case 130 are connected by a magnetic force, or tied together mechanically, so as for both the primary rechargeable battery 117 and the second secondary rechargeable battery 137 to provide power to the load. The second usage mode is higher in battery capacity, for example, 8500 mAh, than the first usage mode. However, the second usage mode has more weight, and thus is suitable for high-power devices like large-screen smartphones or tablets.

Figure 6:
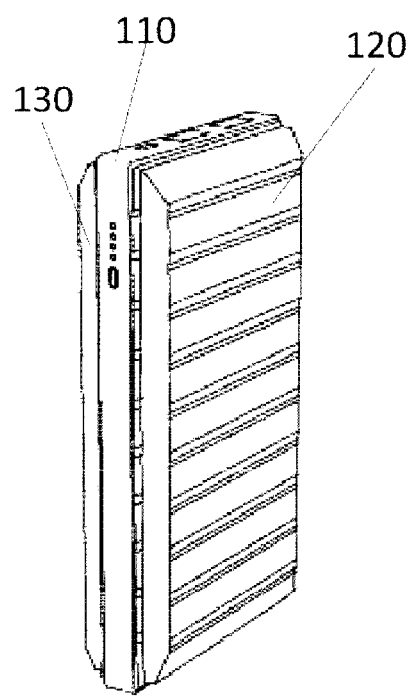
FIG. 6 is a perspective view showing the third usage mode of an illustrative mobile power device according to one embodiment of the disclosure.

Referring to FIG. 6 for the third usage mode of the mobile power device 100 according to an embodiment of this disclosure. As shown in FIG. 6, the primary case 110, the first secondary case 120, and the second secondary case 130 are connected by magnetic forces, so as for the primary rechargeable battery 117, the first secondary rechargeable battery 127, and the second secondary rechargeable battery 137 to provide power to the load. In all usages modes of the mobile power device 100, the third usage mode is the highest in battery capacity, for example, 12000 mAh. The third usage mode has, however, the most weight, and thus is suitable for the purpose of traveling on a long trip.

It should be noted that the combination of the primary case and the secondary cases can be made to fit different requirements. The foregoing embodiments are illustrative only and should not be construed as restrictive of the disclosure.

Figure 7:
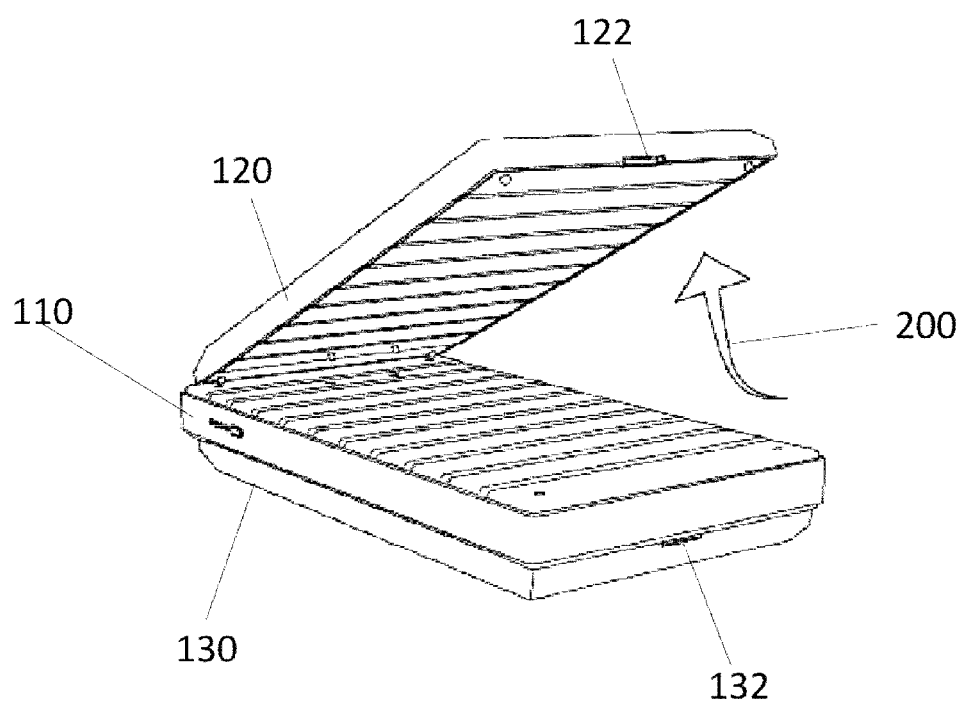
FIG. 7 is a perspective view showing the usage mode of an illustrative mobile power device.

Referring to FIG. 7 for an illustration of separation of the mobile power device 100 according to an embodiment of this disclosure. The first secondary case 120 and the second secondary case 130 respectively further include a concave trough 122 and a concave trough 132. The structure of the concave troughs 122 and 132 provides a means for a user to easily separate the first secondary case 120 and/or the second secondary case 130 from the primary case 110. When the mobile power device 100 is used in the second or third usage mode, the primary case 110, the first secondary case 120 and the second secondary case 130 may separate unexpectedly due to heavy swing or collision. To avoid this problem, the magnetic force should be strong enough to attract the primary and secondary cases firmly, only to cause some inconvenience to separate them. The concave trough 122, which is formed at the bottom edge of the first secondary case 120, allows the user to easily separate the first secondary case 120, along the arrow direction 200 (shown in FIG. 7), from the primary case 110, thereby increasing convenience to use the mobile power device 100. The concave trough 132, formed at the bottom edge of the second secondary case 130, has the same function for the second secondary case 130.

What is claimed is:
1. A mobile power device, comprising:
a primary rechargeable battery;
a primary case for covering said primary rechargeable battery;
a charging electrical port, exposed to the exterior of said primary case and coupled to said primary rechargeable battery, serving to connect to an external power source for charging said primary rechargeable battery;
a first discharging electrical port, exposed to the exterior of said primary case and coupled to said primary rechargeable battery, serving to connect to a load to be powered via said first discharging electrical port;
a plurality of first primary electrical contacts, exposed to the exterior of said primary case and coupled to said primary rechargeable battery;
a primary magnetic member, disposed on said primary case, wherein said primary magnetic member is made of ferromagnetic material or ferrimagnetic material;
a first secondary rechargeable battery;
a first secondary case for covering said first secondary rechargeable battery;
a plurality of first secondary electrical contacts, exposed to the exterior of said first secondary case and coupled to said first secondary rechargeable battery; and
a first secondary magnetic member, disposed on said first secondary case, wherein said first secondary magnetic member is made of ferromagnetic material or ferrimagnetic material,
wherein said primary magnetic member or said first secondary magnetic member is a magnet, and said primary case and said first secondary case are combined together by a magnetic force such that said first primary electrical contacts are coupled to said first secondary electrical contacts.

2. The mobile power device as of claim 1, further comprising:
a plurality of second primary electrical contacts, exposed to the exterior of said primary case and coupled to said primary rechargeable battery;
a second secondary rechargeable battery;
a second secondary case for covering said second secondary rechargeable battery;
a plurality of second secondary electrical contacts, coupled to said second secondary rechargeable battery; and
a second secondary magnetic member, disposed on said second secondary case, wherein said second secondary magnetic member is made of ferromagnetic material or ferromagnetic material,
wherein said primary case and said second secondary case are combined together by a magnetic force such that said second primary electrical contacts are coupled to said second secondary electrical contacts.

3. The mobile power device as of claim 1, wherein said first secondary case or said second secondary case further includes a concave trough formed at the bottom edge of said first secondary case or said second secondary case, so as for a user to detach said first secondary case or said second secondary case from said primary case.

4. The mobile power device as of claim 1, wherein said primary rechargeable battery is selected from the group consisting of a lithium-ion battery, a lithium-ion polymer battery, a NiMH battery, a NiCd battery, a NiFe battery, a fuel cell, and a lead-acid battery.

5. The mobile power device as of claim 1, wherein said first secondary rechargeable battery is selected from the group consisting of a lithium-ion battery, a lithium-ion polymer battery, a NiMH battery, a NiCd battery, a NiFe battery, a fuel cell, and a lead-acid battery.

6. The mobile power device as of claim 2, wherein said second secondary rechargeable battery is selected from the group consisting of a lithium-ion battery, a lithium-ion polymer battery, a NiMH battery, a NiCd battery, a NiFe battery, a fuel cell, and a lead-acid battery.

7. The mobile power device as of claim 1, further comprising:
a power switch, exposed to the exterior of said primary case and coupled to said primary rechargeable battery, turning on and off the power to said load; and
a power indicator light, exposed to the exterior of said primary case, wherein said power indicator light indicates the power to said load being turned on or off, or the percentage of power remaining in said primary rechargeable battery.

8. The mobile power device as of claim 1, wherein said first discharging electrical port complies with the one selected from the group consisting of a type-A, a type-B, a mini-A, a mini-B, a micro-A, a micro-B, or a micro-AB of USB, and a powered-B of USB 3.0.

9. The mobile power device as of claim 1, wherein said charging electrical port complies with the one selected from the group consisting of a type-A, a type-B, a mini-A, a mini-B, a micro-A, a micro-B, or a micro-AB of USB, and a powered-B of USB 3.0.

10. The mobile power device as of claim 1, further comprising a second discharging electrical port, wherein said second discharging electrical port is exposed to the exterior of the primary case and coupled to said primary rechargeable battery, and is used to connect to another load to be powered via said second discharging electrical port.

* * * * *